Figure 1:
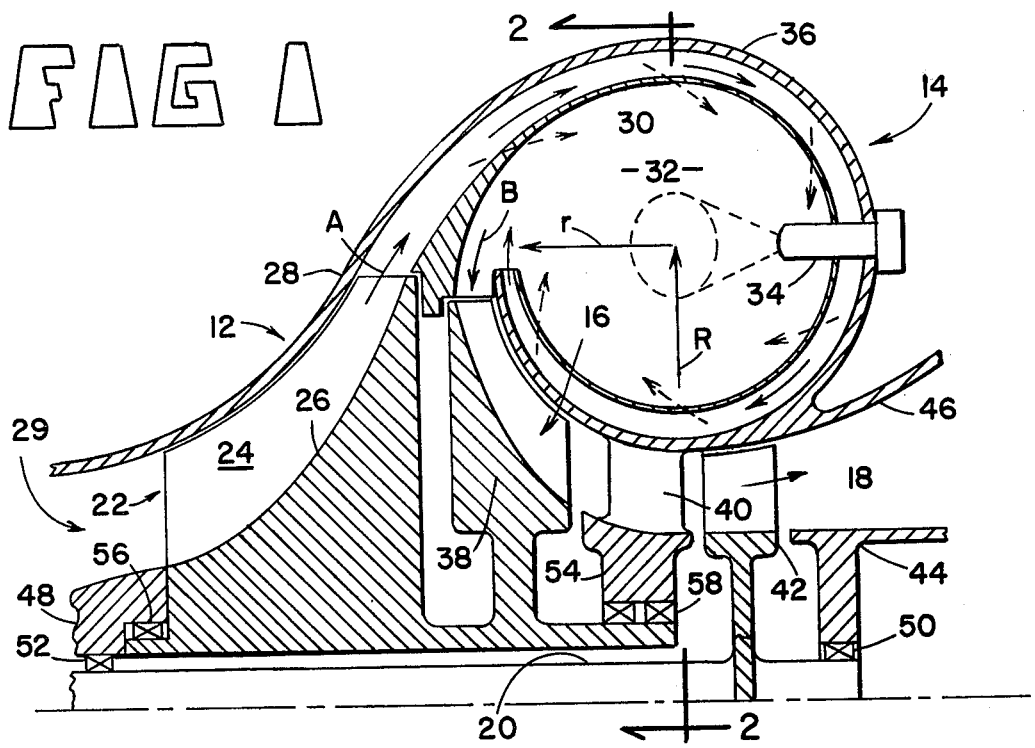

United States Patent [19]

Melconian et al.

[11] 4,151,709

[45] May 1, 1979

[54] GAS TURBINE ENGINES WITH TOROIDAL COMBUSTORS

[75] Inventors: Jerry O. Melconian, South Hamilton, Mass.; Sidney C. Watkins, Bloomfield, Conn.

[73] Assignee: Avco Corporation, Stratford, Conn.

[21] Appl. No.: 745,426

[22] Filed: Nov. 26, 1976

Related U.S. Application Data

[63] Continuation of Ser. No. 614,811, Sep. 19, 1975, abandoned.

[51] Int. Cl.$^2$ .............................................. F02C 3/08
[52] U.S. Cl. .................................. 60/39.36; 60/39.65; 60/39.74 R
[58] Field of Search ............ 60/39.36, 39.65, 39.74 R, 60/39.74 S

[56] References Cited

U.S. PATENT DOCUMENTS

| | | | |
|---|---|---|---|
| 2,658,338 | 11/1953 | Leduc | 60/39.36 |
| 2,855,754 | 10/1958 | Giannotti | 60/39.36 |
| 2,924,937 | 2/1960 | Leibach | 60/39.65 |
| 3,010,281 | 11/1961 | Cervenka et al. | 60/39.65 |
| 3,285,006 | 11/1966 | Freeman et al. | 60/39.65 |
| 3,309,866 | 3/1967 | Kydd | 60/39.36 |
| 3,613,360 | 10/1971 | Howes | 60/39.65 |
| 4,018,043 | 4/1977 | Clemmens | 60/39.74 R |

OTHER PUBLICATIONS

Judge; A. W., "Small Gas Turbines", MacMillan Co., N.Y, 1960, p. 279.

*Primary Examiner*—Robert E. Garrett
*Attorney, Agent, or Firm*—Ralph D. Gelling

[57] ABSTRACT

A gas turbine engine is described in which a compressor, combustor and turbine are arranged in series flow relationship. The compressor discharge is outwardly angled. This pressurized air is then introduced into a toroidal combustion chamber of the combustor to create an annular vortex within which the combustion process is maintained. The hot gas stream generated is discharged from the combustion chamber to a centripital turbine which drives the compressor rotor. A portion of the pressurized air is introduced into the combustion chamber adjacent the hot gas stream discharge exit and in general flow opposition thereto, to dilute the hot gas stream and confine the combustion process within the combustion chamber, thereby minimizing the possibility of overtemperaturing the turbine. The combustor housing also defines the outer bounds of the hot gas stream flowing through the turbine. A power turbine converts a major portion of the energy of the hot gas stream to a motive shaft power output.

5 Claims, 2 Drawing Figures

U.S. Patent    May 1, 1979    4,151,709

GAS TURBINE ENGINES WITH TOROIDAL COMBUSTORS

This is a continuation of application Ser. No. 614,811 filed September 19, 1975, now abandoned.

The present invention relates to improvements in gas turbine engines and more particularly to improved gas turbine engines incorporating a novel combustor.

Gas turbine engines basically comprise, in series flow relationship, a compressor for pressurizing an air stream, a combustor in which the pressurized air supports combustion of fuel in the generation of a high energy, hot gas stream, and a turbine which extracts a portion of the energy of the hot gas stream to drive the rotor of the compressor, these components being commonly referenced as a gas generator. The major portion of the remaining energy of the hot gas stream is then converted to a useful output, as by being discharged through a propulsion nozzle in the flight of an aircraft, or by driving a power turbine from which motive shaft power may be derived.

One of the basic goals in the development of gas turbine engines is to obtain maximum thrust or shaft horsepower from an engine of minimum weight and maximum compactness. In attaining these goals basic requirements of serviceability and service life must also be met.

The combustor, as a major engine component contributes significantly to engine weight and to its length and diameter, these being parameters of compactness. Today, there are only two types of combustors having widespread use in high performance gas turbine engines. One is the through flow type which may be relatively small in diameter, but contributes significantly to overall engine length. The other is the reverse flow which contributes significantly to engine diameter, but results in shorter engine lengths. It will also be noted that through flow combustors are most commonly used in axial flow engines, while reverse flow combustors are employed in radial flow engines, these terms referencing the fluid flow direction in the compressors and/or the turbines of the engines.

In both of these types of combustors, the combustion process takes place while the air and fuel are flowing in an axial direction. The length of the combustor thus becomes a function of the time required to complete the combustion process. Combustor length is also a function of the time required to admix secondary cooling air to reduce the peak temperature of combustion ot a level low enough to prevent the turbine from being burned out or having its service life unduly shortened.

Another shortcoming of such conventional combustors is that it is necessary to employ turning vanes to remove all or a major portion of the tangential flow vector component, or swirl, imparted to the air as it is discharged from the compressor. This is required for proper entry of the air into the combustor. Thereafter it is necessary to redeflect the hot gas stream discharged from the combustor, by the vanes of the turbine nozzle diaphragm, to obtain a proper angle of impingement on the blades of the turbine rotor. In turning the air after it leaves the compressor and then re-turning it for entry into the turbine, energy losses are sustained which decrease overall engine efficiency and the amount of useable power available from the engine.

These limitations of conventional combustors have been recognized and there have been prior proposals to employ toroidal combustors to reduce engine length through the generation of an annular flow path for the combustion process. These proposals have not necessarily fully attained the goal of reduced engine length and encountered problems of assuring that the combustion process is completed and the hot gas stream is not at too high a temperature when it enters the turbine.

Accordingly one object of the invention is to provide an improved gas turbine engine in which the turbine and compressor cooperate with a toroidal combustor to attain a compact engine of minimum length.

Another object of the invention is to attain the above ends and also to control the combustion process so that overtemperaturing of the turbine is eliminated or, at least, greatly minimized.

A further object of the invention is to accomplish the foregoing in a manner compatible with light weight, engine construction and to provide the capability of a relatively long operating life.

These ends are attained, in accordance with the broader aspects of the invention, by a gas turbine engine having the normal, basic components of a compressor, a combustor and a turbine arranged in series flow relationship. The combustor has a toroidal combustion chamber into which pressurized air is introduced to generate a vortex annularly of the major axis of the chamber. Fuel is introduced and combustion thereof is maintained within this annular vortex. The hot gas stream thus generated is then discharged through an annular exit tangentially of the minor radius of the combustion chamber to drive the bladed rotor of the turbine. The turbine rotor is coupled to the compressor rotor, in the usual fashion to pressurize the air in the compressor.

Preferably, a portion of the pressurized air is introduced into the combustion chamber tangentially of its minor radius, at and inwardly of the discharge exit and in general flow opposition to the hot gas stream discharge flow. Simple openings may be provided in the liner defining the combustion chamber for the introduction of the remaining pressurized air therein.

The outer bounds of the air flow path from the compressor to the combustion chamber may be defined by a housing, which is an extension of the compressor housing. This housing is in generally toroidal, spaced relation from the outer surface of the combustion chamber liner and forms a part of the means for tangentially introducing pressurized air into the combustion chamber. The downstream end of this housing may also extend into spaced relationship with the inner surface of the combustion chamber liner to define the discharge exit therefrom. Further, the outer surface of the downstream end portion of this housing may also define the outer bounds of the hot gas stream flow through the turbine.

The flow passageways from the compressor to the combustor and from there to the turbine may be vaneless because of the tangential, flow vector component which is maintained in the fluid passing through these components. The compactness thus attained may be further increased by a compressor having an outwardly angled discharge flow tangential of the minor radius of the combustion chamber and by disposing the combustion chamber exit radially inwardly towards a centripital turbine.

Other features are found in the use of spaced slots to introduce pressurized air into the combustion chamber, in general flow opposition to the hot gas stream discharge, in restraining the combustion process within the combustion chamber and minimizing the possibility of overtemperaturing the turbine. There are also preferred relationships of these slots, as well as the air introducing openings in the liner, to fuel nozzles which are employed in introducing fuel into the combustion chamber.

The above and other related objects and features of the invention will be apparent from a reading of the description of the disclosure, with reference to the accompanying drawing, and the novelty thereof pointed out in the appended claims.

Figure 2:
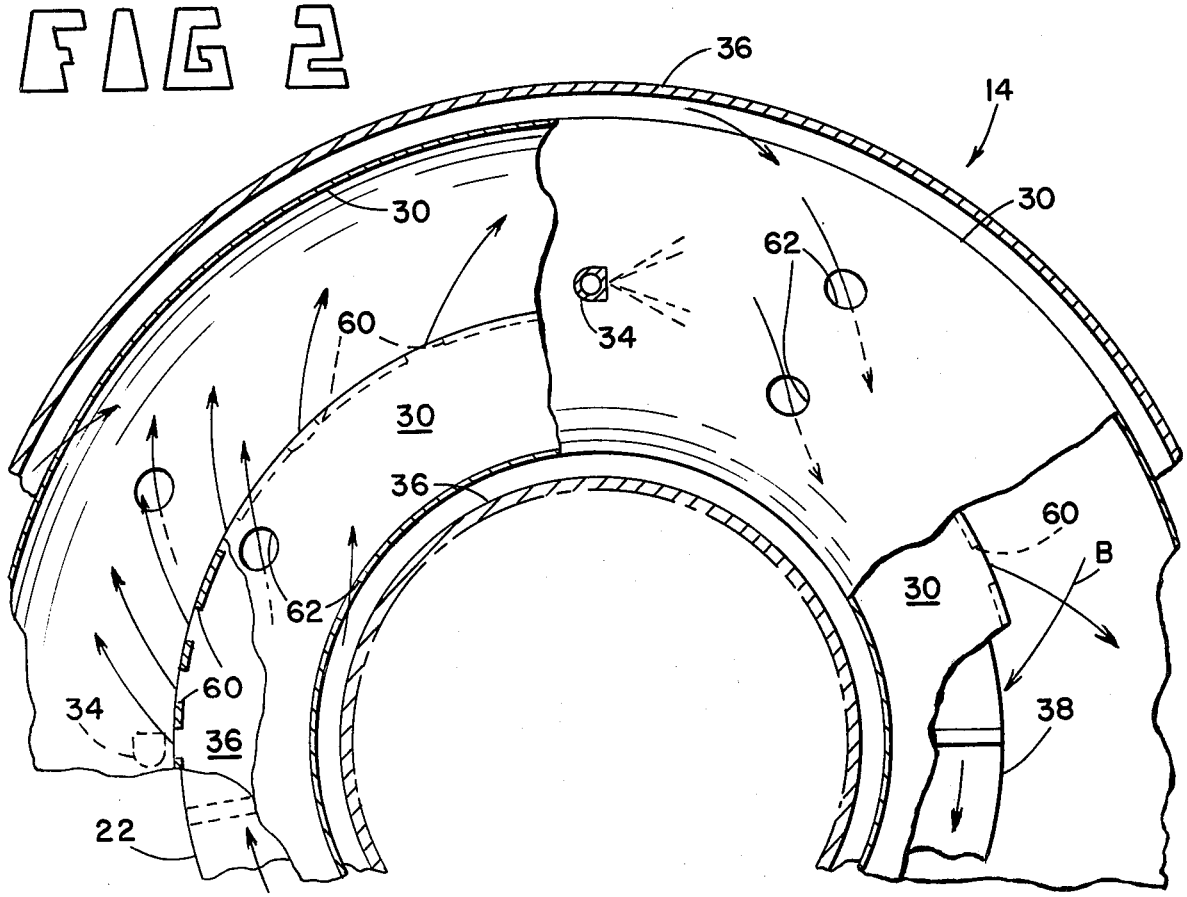

In the drawing:

FIG. 1 is a simplified, schematic, longitudinal half section of a gas turbine engine embodying the present invention; and FIG. 2 is a section taken on line 2—2 in FIG. 1.

The gas turbine engine illustrated in FIG. 1 comprises the basic components of such engines, namely a compressor 12, a combustor 14 and a turbine 16, which comprise what is commonly referenced as a gas generator. This gas generator produces a high energy, hot gas stream which drives a power turbine 18 from which motive power may be derived by way of an output shaft 20. Alternatively, this hot gas stream may be discharged through a nozzle for the propulsion of an aircraft.

The compressor 12 comprises an impeller 22 having blades 24 projecting from a hub 26 into close clearance relationship with a surrounding housing 28. The hub 26 defines, in combination with the housing 28, an annular compressor flow path which curves from a generally axially facing inlet 29, to an outwardly angled discharge exit, indicated at arrow A. The compressor flow path is progressively reduced in area towards the discharge exit. Thus, as the impeller 22 rotates, air is accelerated and its energy level increased as it passes through the compressor 12.

This pressurized air then supports combustion of fuel in the compressor 14 in the generation of the hot gas stream. The combustor 14 comprises an inner liner 30 which defines a combustion chamber 32 into which fuel is introduced by nozzles 34. The flow path of the pressurized air from the compressor 12 to the combustor 14 is defined by the outer surface of the liner 30 and a housing 36, which is an extension of the compressor housing 28. At this point it wil be noted that constructional details which would be within the abilities of those skilled in the art are not shown herein. Thus, for example the housings 28 and 36 would in all probability be separately formed.

The combustor housing 36 is in toroidal, spaced relationship from the liner 30 with its downstream end inwardly spaced from the inner surface of this liner to define an annular discharge exit, indicated by arrow B, for the hot gas stream generated in the combustion chamber. The hot gas stream flows through this exit to the turbine 16, which is of the centripital type and comprises a bladed turbine rotor 38 that is directly coupled to the compressor rotor 22. The blades of the turbine 60 rotor 38 rotate in close clearance relationship to the outer surface of the downstream end portion of the housing 36 which thus defines the outer bounds of the hot gas stream flow through the turbine 16. The turbine 16, through the coupled rotors 22 and 38, extracts a relatively small portion of the energy of the hot gas stream to pressurize the air flowing to the combustor 14.

The majority of the remaining energy of the hot gas stream is then converted to a useful output through the power turbine 18. This hot gas stream passes from the rotor 38 to nozzle diaphragm 40 which directs it to the bladed rotor 42 of the power turbine. The hot gas stream is then discharged in a generally axial direction between a frame member 44 and a duct 46 extending from the housing 36.

The turbine rotor 42 is mounted on the turbine output shaft 20, which extends in a forwardly direction to an inlet frame member 48. The shaft 20 may extend beyond the frame member 48 to provide motive power either directly or through a reducing gear box (not shown). The shaft 20 may be journaled on the frame members 44 and 48 by bearings 50 and 52. The compressor rotor 22 may be journaled on the frame member 48 and the turbine rotor 38 may be journaled on a frame member 54, by bearings 56 and 58 respectively.

The fluid flow characteristics of the combustor 14 and the combustion chamber 32 will now be decreased with further reference to FIG. 2. The combustion chamber 32 is generally toroidal in configuration with its major axis coaxial with the axis of rotation of the rotors 22 and 38. The minor radius r of this toroid is swung from its center of revolution at the major radius R. A portion of the pressurized air is introduced into the combustion chamber 32 through slots 60 formed at the downstream ends of the liner 30 and the housing 36. The remainder of the pressurized air is introduced through openings 62 formed in the liner 30.

The pressurized air, as it is discharged from the compressor rotor 22, has a tangential flow vector component. This flow vector component is essentially unmodified as the air flows through the passageway defined by the liner 30 and housing 36 and enters the combustion chamber 32 through the slots 60 and openings 62, as is indicated by the several arrows in the drawing. This spiralling flow of air creates an annular vortex within the combustion chamber 32. The fuel nozzles 34 continuously discharge fuel into this vortex, where, once ignition has been obtained by appropriate means, not shown, the combustion process takes place. Since the combustion process takes place within the infinite length of the annular vortex, the axial length required is greatly minimized.

The air introduced through the openings 62 functions primarily as primary air in generating the vortex and supporting combustion of fuel and also serves to cool the liner. Preferably the openings 62 are angularly spaced relative to the center of the minor radius r and disposed downstream of each fuel nozzle 34 to better deflect the combustion flame away from the liner surface.

The air introduced through the slots 60 functions primarily as secondary air to reduce the temperature level of the hot gas stream flowing to the turbine 16. This air is introduced tangentially of the minor radius r and is in general flow opposition to the hot gas stream discharge through the combustion chamber exit, indicated by arrow B. This flow is also inwardly off and adjacent the discharge exit. This tangential flow of pressurized air serves to maintain the combustion process within the combustion chamber and with the dilution it provides, effectively prevents, or at least minimizes, overtemperaturing of the turbine 16.

It will be seen that the slots 60 are preferably arranged in series with respect to each of the fuel nozzles 34. The slots of each series are progressively spaced further apart and have progressively increasing lengths in a direction (relative to the vortical, annular air flow and fuel flow) downstream of the fuel nozzle with which they are associated.

It will be noted that the original, tangential flow vector component, which existed in the pressurized air flowing into the combustion chamber 32, is maintained in the hot gas stream discharged to the turbine 16, even though it may be modified as to angle. Thus the usual, vaned turbine nozzle diaphragm may be eliminated and a vaneless turbine inlet employed, as is illustrated.

The described, vaneless flow passageways from the compressor exit to the turbine rotor inlet represent the optimum in eliminating turning losses and weight reduction, as well as economy of construction. There may be circumstances, however, where vanes are desirable in these flow passageways, particulary at the turbine inlet. When there is such need the existing tangential flow vector component will reduce the required turning angle to a minimum and with it reduce losses and require a minimum in weight increase for the addition of vanes.

While the angled flow discharge compressor and centripital turbine combine with the toroidal combustor to achieve a high degree of compactness, other flow type compressors and turbines may be employed within the scope of the broader aspects of the invention. The spirit and scope of the present inventive concepts are therefore to be derived solely from the following claims.

Having thus described the invention, what is claimed as novel and desired to be secured by Letters Patent of the United States is:

1. A gas turbine engine comprising, in series flow relationship,

A compressor, including a rotor, for pressurizing an annular stream of air and imparting thereto a tangential flow vector component, a combustor having a toroidal combustion chamber, said chamber being generally a circular section rotated about the rotor axis, said combustor comprising a liner which is essentially of circular cross section, the inner surface of which defines the outer bounds of the combustion chamber, said engine including a casing, a portion of which is also of toroidal configuration and outwardly spaced from said liner and defining in combination therewith the compressed air flow path from the compressor to the combustion chamber, the casing and liner extending from their upstream ends, at the compressor discharge, to their downstream ends which are spaced inwardly from the inner surface of the liner, means for introducing the compressed air into the combustion chamber with its tangential flow vector essentially unmodified to thereby generate an annular vortex within said chamber and provide primary combustion air, the downstream terminal ends of the liner and casing defining an annular, secondary inlet for the remainder of the compressed air, said secondary air inlet being directed tangentially of the minor axis of the toroidal combustion chamber to thereby facilitate the generation of an annular vortex therein, said combustor further comprising means for inroducing fuel into said vortex and maintaining combustion thereof in an endless combustion path to thereby generate a high energy hot gas stream, the outer surface of the downstream end of the casing, which is spaced inwardly from the inner surface of said combustor liner, defining an annular combustion chamber discharge exit tangentially of the minor axis of the chamber, said combustion chamber discharge exit being annularly coextensive with the secondary air inlet, whereby the hot gas stream is discharged from the combustion chamber with a substantial tangential component derived from the compressor and in general flow opposition to the secondary air introduced through the secondary air inlet, which is on the opposite side of the downstream end of said casing, and a turbine having a rotor driven by the hot gas stream discharged from the combustion chamber exit and coupled to the compressor rotor to drive the latter.

2. A gas turbine engine as in claim 1 wherein the flow directions of the combustion chamber inlet and exit are generally in plains normal to the rotor axis, and the turbine is of the centripital type.

3. A gas turbine engine as in claim 2, wherein the liner has a plurality of holes angularly spaced relative to both the major and minor axes of th combustion chamber and providing the means for introducing the primary air into the combustion chamber.

4. A gas turbine engine as in claim 3 wherein the plurality of holes angularly spaced relative to both the major and minor axes of the combustion chamber for the introduction of primary air, are of essentially the same size.

5. A gas turbine engine as in claim 4 wherein the fuel introducing means comprises a plurality of fuel nozzles angularly spaced relative to the major axis of the toroidal combustion chamber and directing fuel towards and in the direction of annular flow of the vortex created by the primary air entering the combustion chamber, and further wherein the ends on the liner and casing defining the secondary air inlet are joined and a plurality of series of slots are formed in the joined portions, there being a series beginning in axial alignment with each nozzle and the slots in each series having a progressively greater length and spacing therebetween in the direction of vortical flow.

* * * * *